(12) United States Patent
Sharma et al.

(10) Patent No.: US 11,025,539 B1
(45) Date of Patent: Jun. 1, 2021

(54) OVERLAY NETWORK HARDWARE SERVICE CHAINING

(71) Applicant: Cisco Technology, Inc., San Jose, CA (US)

(72) Inventors: Samar Sharma, San Jose, CA (US); Rajesh Sharma, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 73 days.

(21) Appl. No.: 16/102,851

(22) Filed: Aug. 14, 2018

Related U.S. Application Data

(60) Provisional application No. 62/567,912, filed on Oct. 4, 2017.

(51) Int. Cl.
| | |
|---|---|
| *H04L 12/46* | (2006.01) |
| *H04L 12/725* | (2013.01) |
| *H04L 12/715* | (2013.01) |
| *H04L 12/721* | (2013.01) |
| *H04L 12/743* | (2013.01) |

(52) U.S. Cl.
CPC .......... *H04L 45/64* (2013.01); *H04L 12/4633* (2013.01); *H04L 45/306* (2013.01); *H04L 12/4645* (2013.01); *H04L 45/72* (2013.01); *H04L 45/7457* (2013.01)

(58) Field of Classification Search
CPC ................................. H04L 45/64; H04L 45/72
USPC ....................................................... 370/392
See application file for complete search history.

(56) References Cited

U.S. PATENT DOCUMENTS

| | | | |
|---|---|---|---|
| 9,407,540 B2 | 8/2016 | Kumar et al. | |
| 9,634,936 B2 | 4/2017 | Bansal et al. | |
| 9,660,905 B2 | 5/2017 | Dunbar et al. | |
| 2006/0262583 A1* | 11/2006 | Venkatachary | G11C 15/00 365/49.17 |
| 2014/0112349 A1* | 4/2014 | Moreno | H04L 45/64 370/400 |
| 2015/0003455 A1 | 1/2015 | Haddad et al. | |
| 2015/0071285 A1* | 3/2015 | Kumar | H04L 45/306 370/392 |
| 2015/0195197 A1 | 7/2015 | Yong et al. | |
| 2015/0309948 A1* | 10/2015 | Kotta | G06F 13/28 710/308 |
| 2018/0359176 A1* | 12/2018 | Nainar | H04L 45/22 |

* cited by examiner

*Primary Examiner* — Angel T Brockman
(74) *Attorney, Agent, or Firm* — Edell, Shapiro & Finnan, LLC

(57) ABSTRACT

Presented herein are techniques to support service chains in a network, such as a spine-leaf switch fabric network, that also uses overlay networking technology. More specifically, in accordance with the techniques presented herein, a linecard at an ingress network node for an overlay network is configured to receive a packet. Using information obtained from the packet, a hardware lookup is performed at the linecard to identify a service chain with which the packet is associated. An entry corresponding to the identified service chain is identified within a memory location of the linecard, where the entry includes overlay network information for forwarding packets along the identified service chain via an overlay network. Using the overlay network information included in the identified entry, the packet is encapsulated with an overlay packet header for use in forwarding the packet via the overlay network.

20 Claims, 9 Drawing Sheets

OVERLAY NETWORK HARDWARE SERVICE CHAINING

CROSS-REFERENCE TO RELATED APPLICATIONS

This application claims priority to U.S. Provisional Application No. 62/567,912 entitled "SERVICE CHAINING IN VXLAN FABRIC," filed Oct. 4, 2017, the content of which is hereby incorporated by reference herein.

TECHNICAL FIELD

The present disclosure generally relates to service chaining and, in particular, to hardware service chaining with overlay networks.

BACKGROUND

Technology has been developed to support hardware-based application/service chaining. This technology supports service chaining without the use of proprietary packet headers or special hardware. Examples of such services that can be chained with one another include, for example, firewalls, intrusion prevention systems (IPDs), intrusion detection systems (IDSs), denial of service (DOS) protection, virtual machines, containers, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

Figure 1:
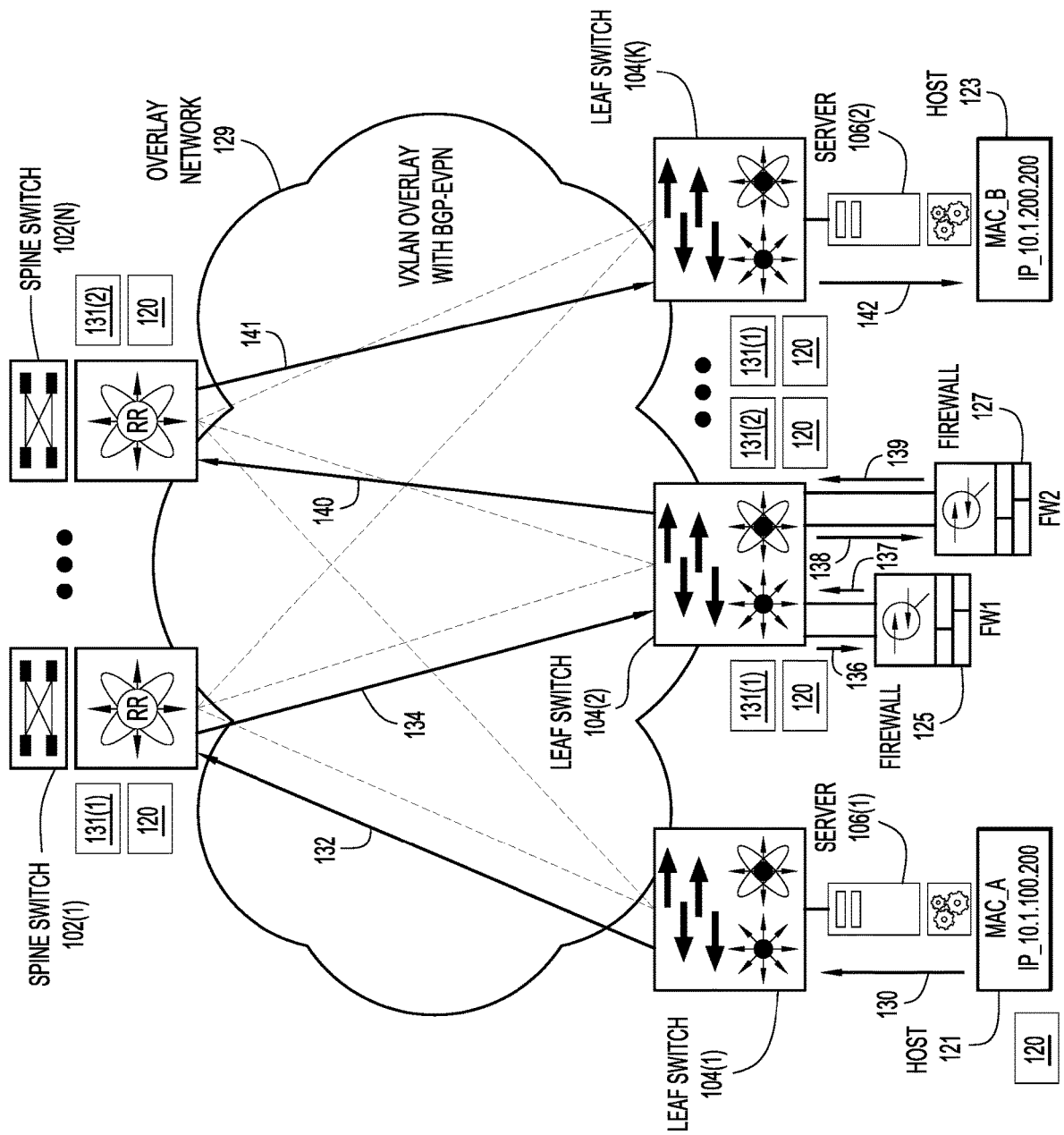
FIG. 1 is a simplified diagram of a datacenter network employing a spine-leaf switch architecture and implementing service chaining techniques presented herein, according to an example embodiment.

Presented herein are techniques to support service chains in a network, such as a spine-leaf switch fabric network, that also uses overlay networking technology. More specifically, in accordance with the techniques presented herein, a linecard at an ingress networking device for an overlay network is configured to receive a packet. Using information obtained from the packet, a hardware lookup is performed at the linecard to identify a service chain with which the packet is associated. An entry corresponding to the identified service chain is identified within a memory location of the linecard, where the entry includes overlay network information for forwarding packets along the identified service chain via an overlay network. Using the overlay network information included in the identified entry, the packet is encapsulated with an overlay packet header for use in forwarding the packet via the overlay network.

EXAMPLE EMBODIMENTS

Overlay networking generally refers to the use of software virtualization to create layers of network abstraction, referred as "network overlays" or "overlay networks" that can be run on top of a physical network, often providing new applications or security benefits. Overlay network protocols include, for example, Virtual Extensible Local Area Networking (VxLAN), Network Virtualization using Generic Encapsulation (NVGRE), Ethernet Virtual Private Networking (EVPN), Generic Routing Encapsulation (GRE), Virtualization Overlays 3 (NVO3), etc.

Overlay networks are created by taking two endpoints and creating a virtual connection between them. That is, an overlay network decouples network services from the underlying infrastructure by encapsulating one packet inside of another packet (i.e., with an overlay packet header). After the encapsulated packet has been forwarded to the endpoint, it is de-encapsulated. The endpoints may be actual physical locations, such as a network port, or they could be logical locations designated by a software address in the networking cloud. The virtual connection between the two endpoints can apply software tags, labels, and/or encryption to create a virtual tunnel that runs through the network.

In conventional arrangements, hardware-based service function chaining (service chaining) cannot be used in networks that also make use of overall networking technology. More specifically, conventional service chains rely upon the use of service packet headers (service headers), such as the Network Service Header (NSH), that are added to the packets/traffic by a switch or other networking device. These services are also modified as the packets move through the service chain (e.g., as the packets are passed between switches and service functions). Additionally, overlay networks rely upon the use of overlay packet headers (overlay headers), such as a VxLAN header. Therefore, if service chains are used with overlay networks, the traffic flowing between switches need the addition of an overlay header, while traffic flowing between switches and the service functions also need the addition of a service header.

Certain advantages can be achieved if the hardware-based application chaining is applied for use with an overlay network protocol, such as VxLAN. Accordingly, presented herein are hardware-based service chaining techniques that support service chaining with overlay networks without the use of proprietary service packet headers. More specifically, presented herein are techniques that use Access Control Lists (ACLs) created at the linecards of networking devices (e.g., switches, routers, etc.) to selectively redirect traffic along one or more predefined/programmed service chains via one or more overlay networks. That is, as described further below, the techniques presented herein provide a hardware (e.g., TCAM) based application chaining solution for networking devices so that packets can be redirected through multiple physical or virtual devices without changing the topology or the existing configuration. Such selective traffic chaining using ACLs enables, for example, any traffic entering at an ingress port of a networking device to be matched against an ACL. If the traffic matches a given ACL, the traffic is ingested into the associated service chain.

Using information in packet 120, including source information (e.g., the virtual local area network (VLAN) tag, source Internet Protocol (IP) address, and source Layer 4 port number) and destination information (e.g., destination IP address and destination Layer 4 port number), the linecard forwarding engine performs a lookup against the ACLs in the at least one TCAM. This lookup identifies the service chain with which packet 120 is associated (e.g., service chain that includes the firewalls 125 and 127), and the forwarding path for the packet (e.g., next hop for the packet, as identified by the ACL(s)).

The result of the TCAM lookup (e.g., identification of the service chain with which packet 120 is associated), is used to locate a corresponding entry in the at least one SRAM (e.g., a stored redirect table). The identified/corresponding entry in the at least one SRAM (redirect table) includes information about the exact/specific overlay header that needs to be added to the packet 120 so that it will be properly forwarded on overlay network 129 to the next hop in the service chain (i.e., to switch 104(2)). For example, the SRAM entry includes details of the specific encapsulation/decapsulation (e.g., VxLAN encapsulation/decapsulation, such as for a VxLAN tunnel adjacency or underlay path adjacency) needed for routing of the packet via the overlay network 129 along the service chain. As noted, the information in an SRAM entry is sometimes referred to herein as "overlay header mapping information" for a given programmed service chain.

Figure 3:
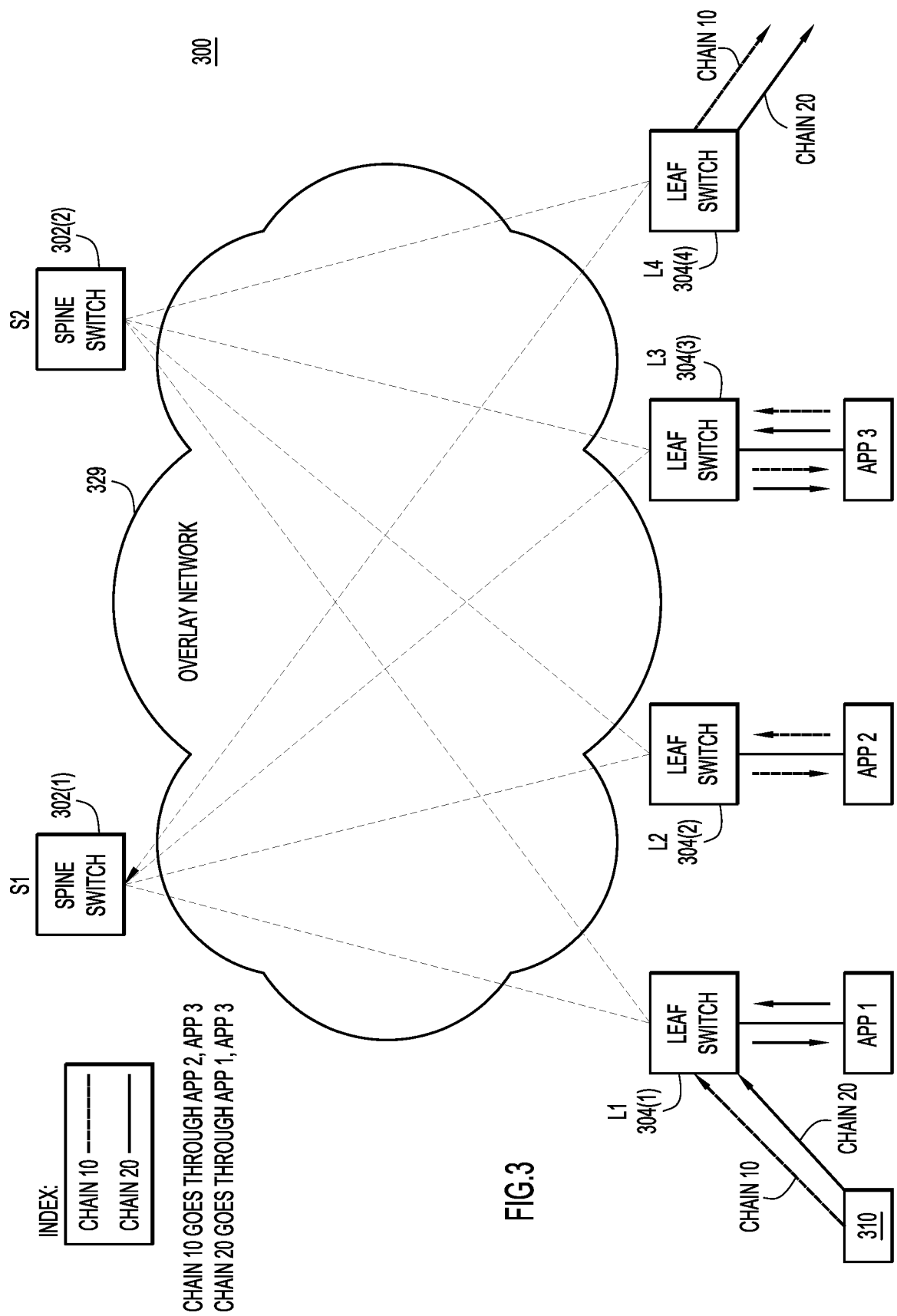
FIG. 3 is a diagram of a spine-leaf switch architecture configured to support multiple service chains simultaneously, according to an example embodiment.

In FIG. 3, traffic is received from a source entity or source network 310. Two different hardware-based service chains, referred to as "Chain 10" and "Chain 20," are configured on the leaf switches 304(1)-304(4), as described elsewhere herein. Chain 10 goes through application 352 (App2) and application 353 (App3), while Chain 20 goes through application 351 (App 1) and application 353 (App3). The path for traffic for Chain 10 is shown using dashed arrows, while the path for traffic for Chain 20 is shown using solid arrows. FIG. 3 is illustrative of that the hardware of the leaf switches can be configured to support multiple service chains simultaneously, as described above with reference to FIG. 1. Additionally, it is noted that leaf switch 304(3) is configured to support traffic from two different service chains to/from application 353 (App3).

Returning to FIG. 6A, at 686, statistics are enabled for the TCAM entries. Operations 682-686 are performed for each linecard (interface) where the associated service chain is configured. These statistics are per-TCAM entry, which enables the tracking and subsequent evaluation of, for example, how much traffic is going to each chain, and to each element within the chain. For example, a firewall may be a service in six (6) service chains and these statistics allow an administrator to determine how much traffic is going to the firewall for each chain. For each service chain, operation 688 is performed to create a probe packet to monitor the health of the next node in the service chain. In general, the entire service chain may be monitored. For example, from the ingress switch, the next hop is monitored (e.g., the switch where the first service is connected). From the switch where the first service is connected, the monitor first service is monitored, and so on.

The spine switches 102(1)-102(N) and leaf switches 104(1)-104(K) may be configured to employ various overlay networking technologies to form one or more overlay networks on/over which traffic may be forwarded. The spine switches 102(1)-102(N) and leaf switches 104(1)-104(K) may also be configured to employ other related technologies. As such, the spine switches 102(1)-102(N) and leaf switches 104(1)-104(K) may be configured to employ Extensible Local Area Networking (VxLAN), Network Virtualization using Generic Encapsulation (NVGRE), Ethernet Virtual Private Networking (EVPN), Border Gateway Protocol (BGP), Generic Routing Encapsulation (GRE), Virtualization Overlays 3 (NVO3), FabricPath, Dynamic Fabric Automation (DFA), etc. In the example of FIG. 1, shown is a single overlay network 129 employing VxLAN with BGP-EVPN. As such, the overlay network 129 is sometimes referred to as a VxLAN overlay with BGP-EVPN.

In the example of FIG. 1, the leaf switches 104(1)-104(K) are configured to perform hardware-based service chaining with overlay network 129. In one example, using the hardware-based service chaining techniques, a packet, represented in FIG. 1 by reference 120, is sourced from Host 121. As shown by arrow 130, the packet 120 is sent to leaf switch 104(1). In accordance with the techniques presented herein, leaf switch 104(1) is configured to selectively direct traffic from Host 121 through a service chain that includes the firewalls 125 and 127.

More specifically, when the leaf switch 104(1) receives packet 120 from host 121, leaf switch 104(1) is the ingress node for overlay network 129. As described further below, the leaf switch 104(1), as well as leaf switches 104(2)-104(K), include one or more linecards that each have a forwarding engine, at least one ternary content-addressable memory (TCAM), and at least one Static Random Access Memory (SRAM). Also as described below, the at least one TCAM includes Access Control Lists (ACLs) for programmed service chains, while the SRAM includes overlay header mapping information for each programmed service chain.

Using information in packet 120, including source information (e.g., the virtual local area network (VLAN) tag, source Internet Protocol (IP) address, and source Layer 4 port number) and destination information (e.g., destination IP address and destination Layer 4 port number), the linecard forwarding engine performs a lookup against the ACLs in the at least one TCAM. This lookup identifies the service chain with which packet 120 is associated (e.g., service chain that includes the firewalls 125 and 127), and the forwarding path for the packet (e.g., next hope for the packet, as identified by the ACL(s)).

The result of the TCAM lookup (e.g., identification of the service chain with which packet 120 is associated), is used to locate a corresponding entry in the at least one SRAM (e.g., a stored redirect table). The identified/corresponding entry in the at least one SRAM (redirect table) includes information about the exact/specific overlay header that needs to be added to the packet 120 so that it will be properly forwarded on overlay network 129 to the next hop in the service chain (i.e., to switch 104(2)). For example, the SRAM entry includes details of the specific encapsulation/decapsulation (e.g., VxLAN encapsulation/decapsulation, such as for a VxLAN tunnel adjacency or underlay path adjacency) needed for routing of the packet via the overlay network 129 along the service chain. As noted, the information in an SRAM entry is sometimes referred to herein as "overlay header mapping information" for a given programmed service chain. In certain embodiments, the Using the information in the identified SRAM entry, the linecard forwarding engine can encapsulate packet 120 with an overlay header 131(1). Thus, as shown by arrow 132, leaf switch 104(1) redirects the packet 120, encapsulated with overlay header 131(1), to spine switch 102(1). That is, as a result of the above operations, the hardware of leaf switch 104(1) is able to selectively redirect traffic along a predefined service chain associated with overlay network 129.

The spine switch 102(1) uses the overlay header 131(1) encapsulating packet 120 to, as shown by arrow 134, direct the packet to leaf switch 104(2). The leaf switch 104(2) removes the overlay header 131(1) and the forwarding engine at the receiving linecard performs a lookup in the at least one TCAM of the receiving linecard to determine the packet 120 should be sent to the firewall 125. As show by arrow 136, leaf switch 104(2) is configured to direct the packet 120 to firewall 125 and, as shown by arrow 137, receive the return track. In response, the forwarding engine at the receiving linecard performs a lookup in the at least one TCAM of the receiving linecard and determines that packet 120 is to be sent to firewall 127. As shown by arrow 138, leaf switch 104(2) directs the packet 120 to firewall 127. As shown by arrow 139, the packet 120 is returned from firewall 127 to leaf switch 104(2).

Upon receiving packet 120 from firewall 127, the forwarding engine at the receiving linecard performs a lookup in the at least one TCAM of the receiving linecard and determines that packet 120 is to be sent over the overlay network to host 123. As such, a corresponding SRAM entry is located and, as detailed above, the information included therein is used to encapsulate packet 120 with overlay header 131(2). As shown by arrow 140, leaf switch 104(2) is then configured to forward the packet 120, encapsulated with overlay header 131(2) and after processing by firewalls 125 and 127, to spine switch 102(N). As shown by arrow 141, spine switch 102(N) uses the overlay header 131(2) to forward the packet 120 to leaf switch 104(K).

The leaf switch 104(K) removes the overlay header 131(2) and the forwarding engine at the receiving linecard performs a lookup in the at least one TCAM of the receiving linecard to determine the packet 120 should be sent to the Host 123. As shown by arrow 142, the packet 120 is then forwarded to Host 123.

As such, arrows 132, 134, 136, 137, 138, 139, 140, and 141 collectively represent a service chain to direct the traffic from Host 121 to Host 123 through the firewalls 125 and 127. In accordance with the techniques presented herein, the service chain created to direct the traffic from Host 121 to Host 123 through the firewalls 125 and 127 is achieved without the use of any proprietary service headers appended to the packets. Instead, the switches 104(1)-104(K) are configured to route the traffic, as described in more detail below, using Access Control Lists (ACLs) configured at the linecards of the switches 104(1)-104(K).

Figure 2:
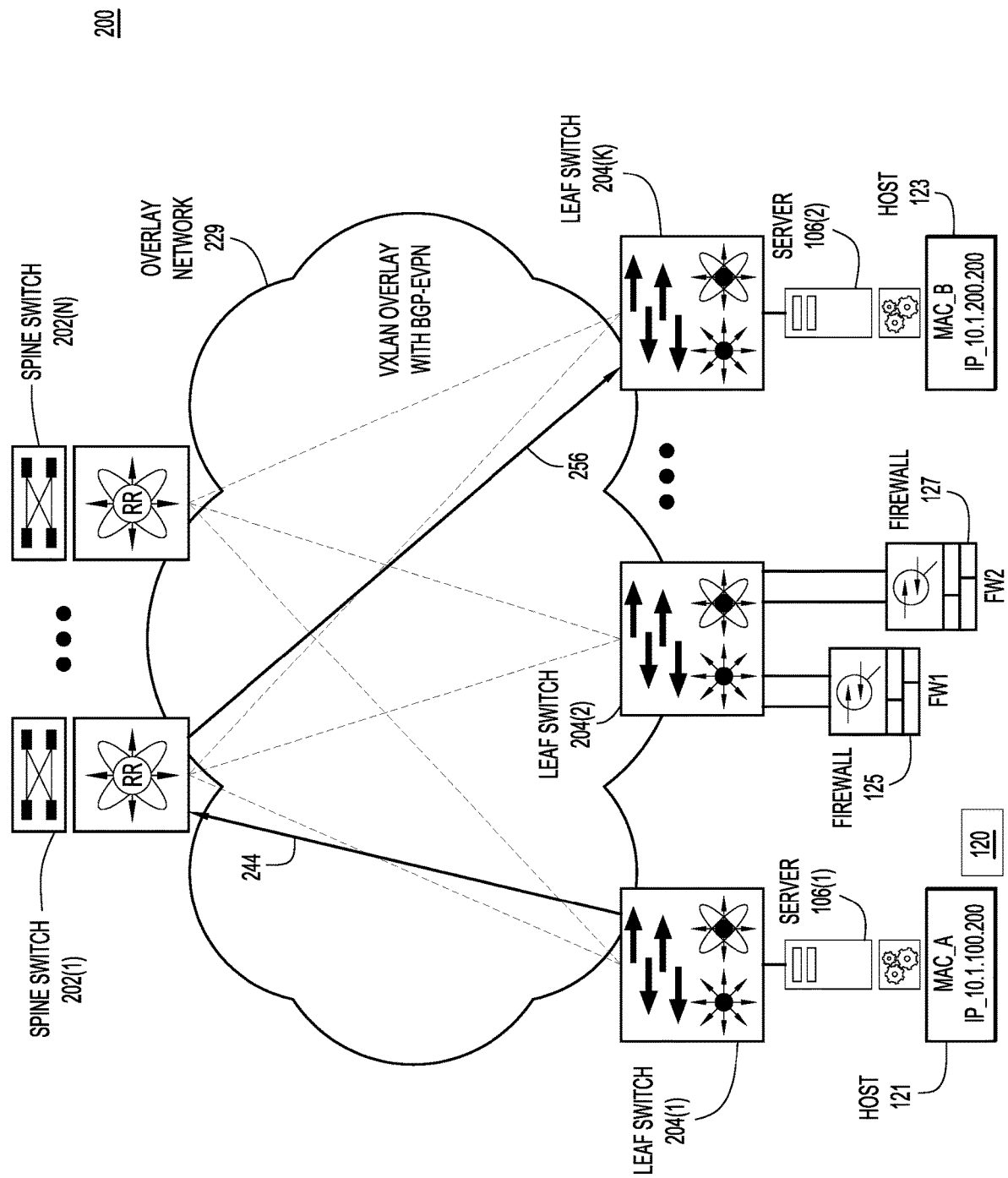
FIG. 2 is a simplified diagram of a datacenter network, similar to FIG. 1, but for which the service chaining techniques presented herein are not configured.

FIG. 2 illustrates a network/system 200 that has a similar spine-leaf arrangement as that shown in in FIG. 1. In particular, network 200 is comprised of spine switches 202(1)-202(N) and leaf switch 204(1)-204(K). Similar to the arrangement of FIG. 1, the spine switches 202(1)-202(N) and leaf switches 204(1)-204(K) may be configured to employ various technologies a single overlay network 229 employing VxLAN with BGP-EVPN (i.e., a VxLAN overlay with BGP-EVPN). However, unlike the arrangement of FIG. 1, in network 200 the leaf switches 204(1)-204(K) are not configured to direct traffic from Host 121 to Host 123 via the firewalls 125 and 125. In this case, as shown by arrow 244, a packet 220 would simply be sent from leaf switch 204(1) to spine switch 202(1) and, as shown by arrow 246, then from spine switch 202(1) to leaf switch 204(K), bypassing the firewalls 125 and 127 connected to leaf switch 204(2).

Reference is now made to FIG. 3. FIG. 3 shows a further example of a leaf-spine network 300 in which the leaf switches L1-L4, referred to as leaf switches 304(1)-304(4), are configured to support multiple service chains in a manner described above with reference to FIG. 1. In particular, leaf switches 304(1)-304(4) each include one or more linecards that each have a forwarding engine, at least one ternary content-addressable memory (TCAM), and at least one Static Random Access Memory (SRAM). Also as described below, the at least one TCAM includes Access Control Lists (ACLs) for any programmed service chains, while the SRAM includes entries with overlay header mapping information for each programmed service chains.

Also shown in FIG. 3 is an overlay network 329. In this example, there are three applications running on servers or other devices (not shown in FIG. 3). These three applications are referred to as application 351 (App1) connected to leaf switch 304(1), application 352 (App2) connected to leaf switch 304(2), and application 353 (App3) connected to leaf switch 304(3). The leaf switches 304(1)-304(4) are connected to spine switches 302(1) and 302(2).

In FIG. 3, traffic is received from a source entity or source network 310. Two different hardware-based service chains, referred to as "Chain 10" and "Chain 20," are configured on the leaf switches 304(1)-304(4), as described elsewhere herein. Chain 10 goes through application 352 (App2) and application 353 (App3), while Chain 20 goes through application 351 (App1) and application 353 (App3). The path for traffic for Chain 10 is shown using dashed arrows, while the path for traffic for Chain 20 is shown using solid arrows. FIG. 3 is illustrative of that the hardware of the leaf switches can be configured to simultaneous support multiple service chains, as described above with reference to FIG. 1. Additionally, it is noted that leaf switch 304(3) is configured to support traffic from two different service chains to/from application 353 (App3).

Figure 4:
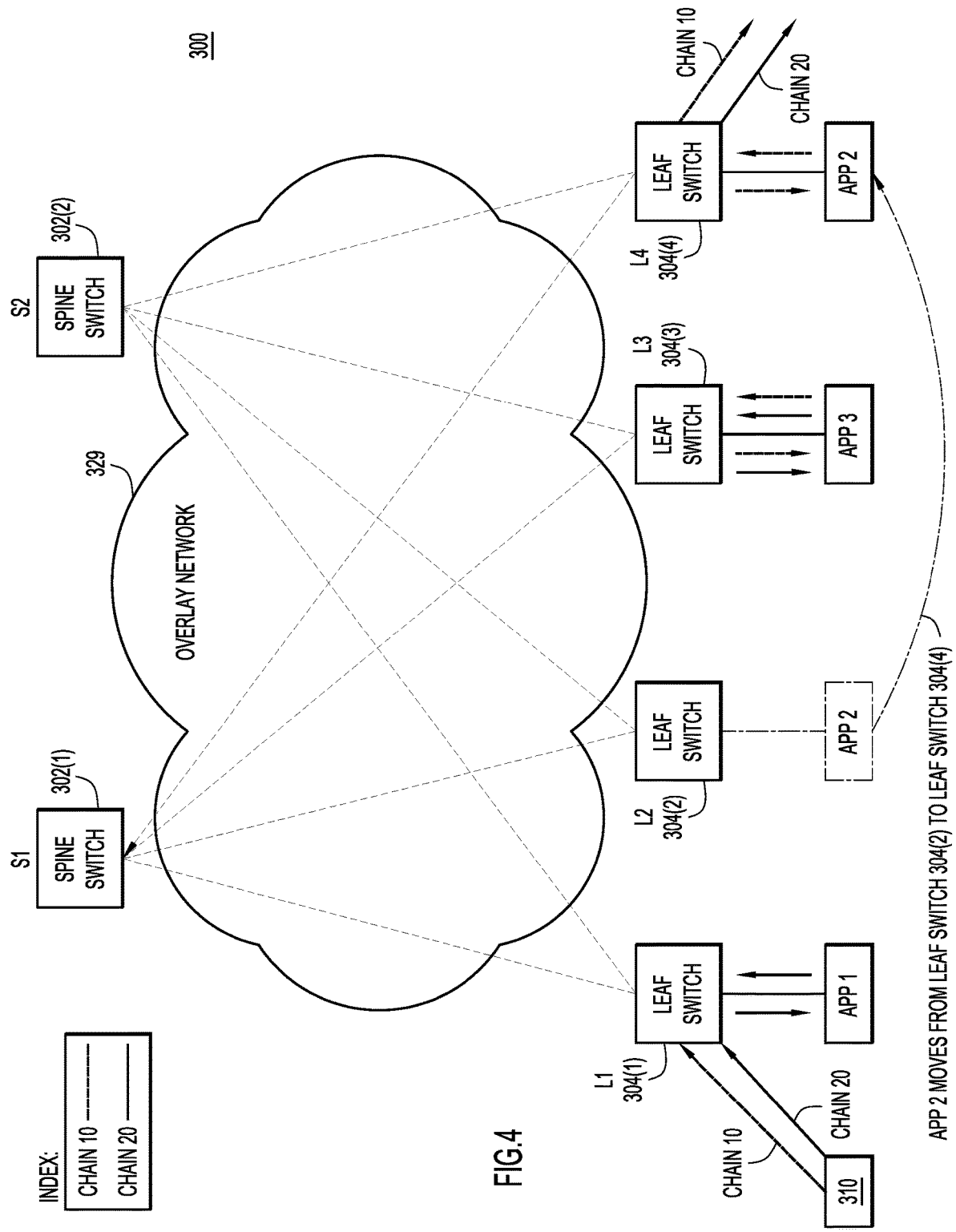
FIG. 4 is a diagram illustrating how the service chaining techniques presented herein operation with movement of an application from one leaf switch to another switch, without disturbing service chain traffic flow, according to an example embodiment.

FIG. 4 is another diagram of leaf-spine network 300 of FIG. 3. However, in the example of FIG. 4, application 352 (App2) moves, at some point in time, from a device connected to leaf switch 304(2) to a device connected to leaf switch 304(4). In accordance with embodiments presented herein, when an element/entity, such as application 352 (App2), moves from a device connected to one leaf switch to a device connected to another leaf switch, traffic for neither the affected nor the unaffected service chain(s) is not disrupted. Instead, as shown in FIG. 4, traffic on Chain 20 is directed from leaf switch 304(1) to switch 304(4) for service by application 352 (App2) on the connected device, and then directed to leaf switch 304(3) to for service by application 353 (App3) on the connected device (e.g., the traffic for Chain 20 goes from L1 to L4, from L4 to App2, from App2 back to L4, from L4 to L3, from L3 to App3, from App3 back to L3, from L3 to L4, and is output by L4). Chain 10 is not affected as traffic on Chain 10 is not serviced by application 352 (App2).

In the embodiment of FIG. 4, no user intervention is needed to account for the movement of an element from one leaf to another leaf. More specifically, when the application 352 (App2) moves, an update is sent via the overlay network 329. As a result of this update, the SRAM entries for Chain 20 at leaf switches 304(1), 304(3), and 304(4) are updated to include the updated service chain to overlay header mapping information therein. As a result, when further packets for Chain 20 are received at leaf switches 304(1), 304(3), or 304(4), the proper overlay header can be appended to the packet.

Figure 5:
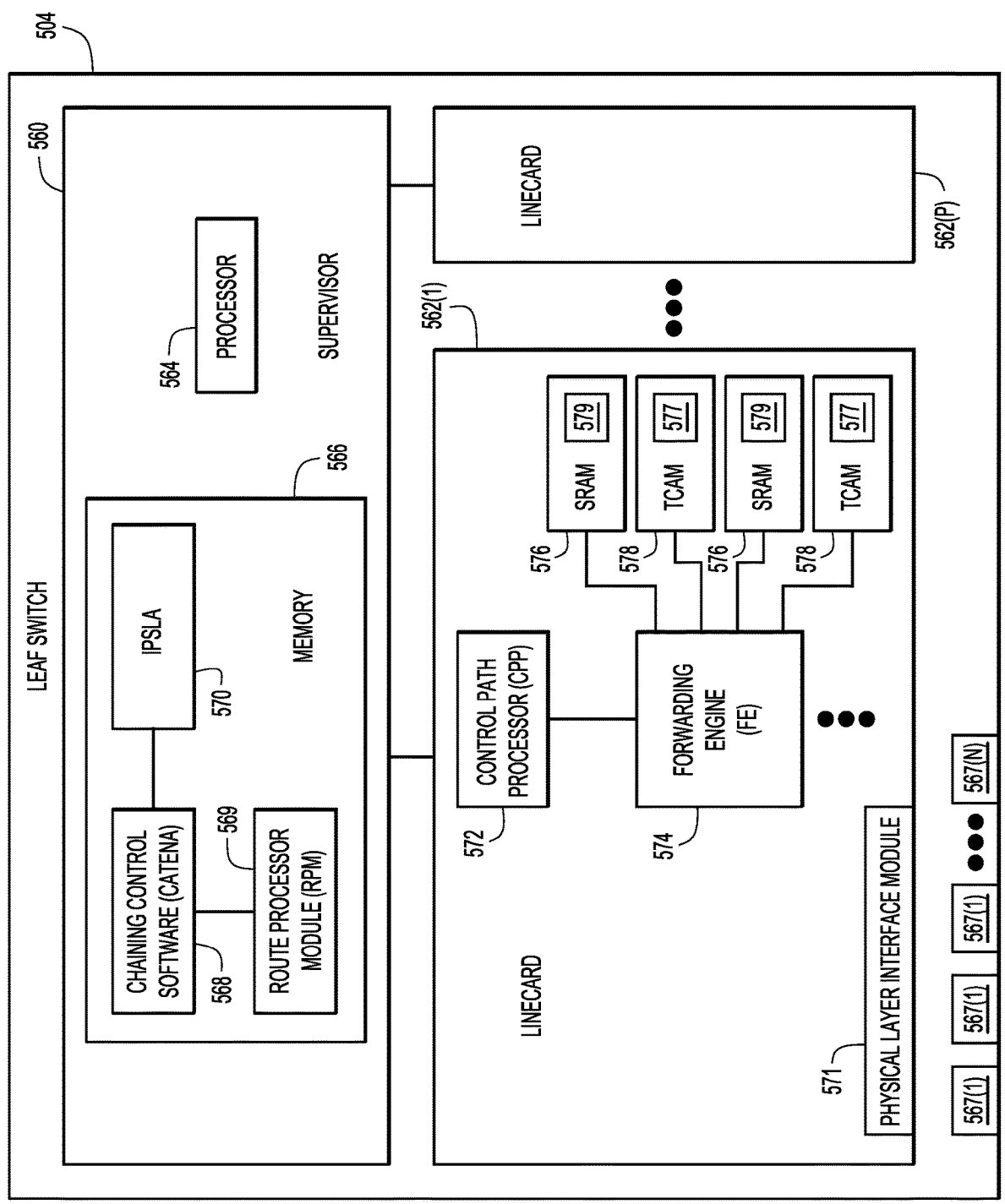
FIG. 5 is a block diagram showing the hardware elements on a leaf switch configured to support the service chaining techniques presented herein, according to an example embodiment.

FIG. 5 is a block diagram illustrating the elements/components of leaf switches, such as leaf switches 104(1)-104(K) of FIG. 1 and leaf switches 304(1)-304(4) of FIG. 3, configured to perform the service chaining techniques described herein. For ease of description, the leaf switch of FIG. 5 is referred to as leaf switch 504.

As shown in FIG. 5, leaf switch 504 includes a plurality of network ports 567(1)-567(N), a supervisor (SUP) module/section 560 and a plurality of hardware Application-Specific Integrated Circuit (ASIC) linecard modules/sections 562(1)-562(P), sometimes referred to herein simply as "hardware ASIC linecards" or simply "linecards." The SUP module 560 includes a processor 564 and a memory 566 that stores instructions that, when executed by the processor 564, cause the processor to perform several functions. Additionally, there is chaining control software (sometimes referred to as Catena) 568, a route processor module (RPM) 569, and an Internet Protocol Service Level Agreement (IPSLA) process 570 stored in memory 566.

The memory 566 may be read only memory (ROM), random access memory (RAM), magnetic disk storage media devices, optical storage media devices, flash memory devices, electrical, optical, or other physical/tangible memory storage devices. Thus, in general, the memory 566 may comprise one or more tangible (non-transitory) computer readable storage media (e.g., a memory device) encoded with software comprising computer executable instructions and when the software is executed (by the processor 564) it is operable to perform the operations described herein.

In each hardware ASIC linecard module 562(1)-562(P), there is a physical layer interface module (interface module) 571 for interfacing within the network ports 567(1)-567(N), a control path processor (CPP) 572, one or more forwarding engines (FEs) 574, several instances of Static Random Access Memory (SRAM) 576, and several instances of ternary content-addressable memory (TCAM) 578 associated with each forwarding engine. For ease of illustration, only a portion of the details of linecard 562(1) are shown in FIG. 5.

In operation, the chaining control software 568 (when executed by processor 564) notifies/instructs the RPM 569 to create TCAM entries 577 and SRAM entries 579 (as described elsewhere herein) to support the service chaining techniques described herein. In addition, the chaining control software 568 may instruct the RPM 569 to enable statistic tracking/monitoring. The RPM 569 (when executed by processor 564) configures an Access Control List Quality of Service (ACLQoS) function of the control path processor 572 to program the forwarding engine 574 of linecard 562(1). The chaining control software 568 (when executed by processor 564) notifies the IPSLA process 570 to start monitoring the health of the elements of the chains configured on the leaf switch 504.

Figure 6A:
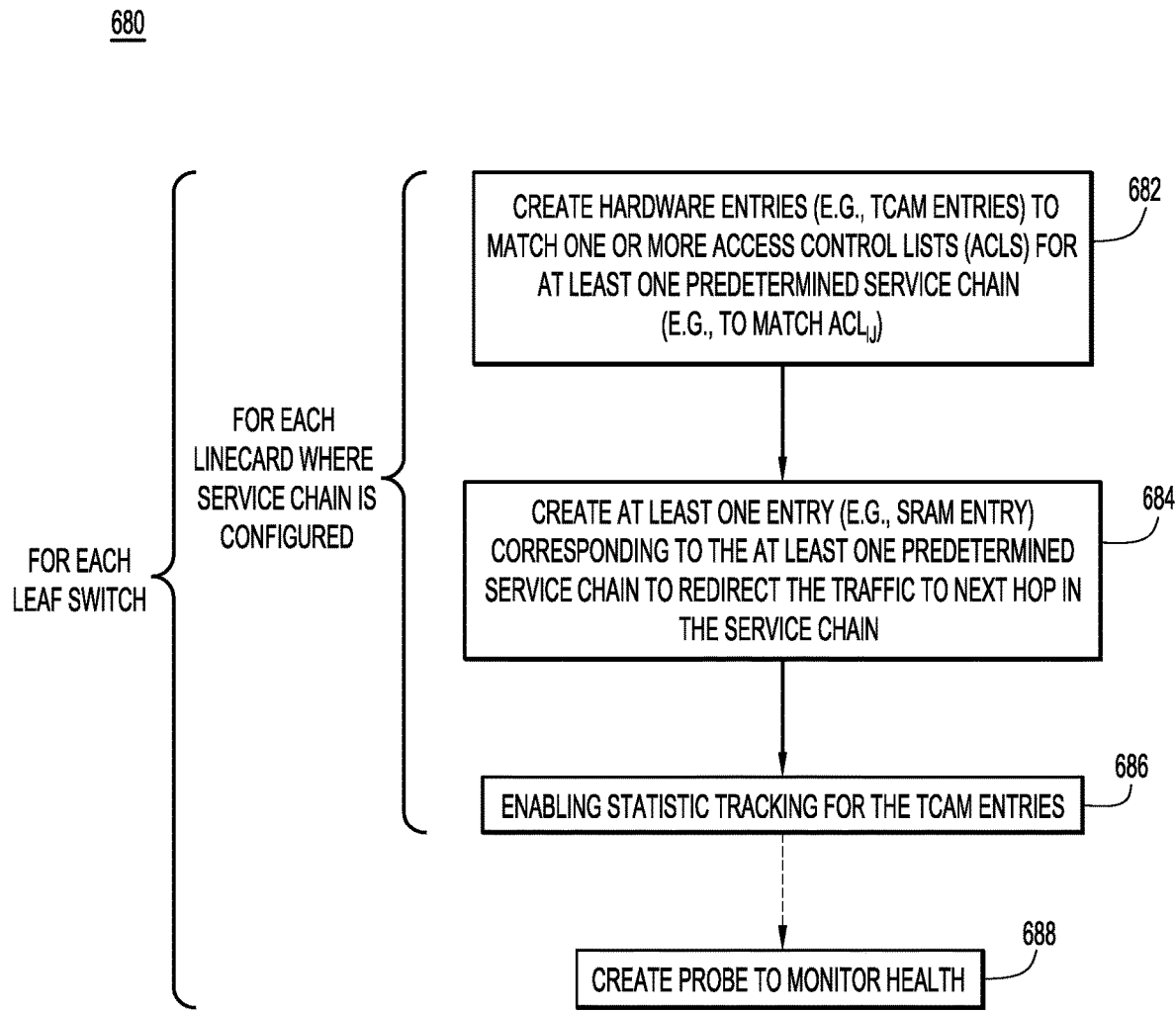
FIG. 6A is a flow chart depicting the operations performed on a leaf switch to configure the service chaining techniques presented herein, according to an example embodiment.

Reference is now made to FIG. 6A for a more detailed explanation of how service chaining is configured/enabled on networking devices (e.g., leaf switches) in accordance with examples presented herein via, for example, a command line interface (CLI). More specifically, FIG. 6A illustrates a process 680 that is performed for each leaf switch in a service chain, a part of which is also separately performed for linecard (interface) of a leaf switch where a service chain is configured.

More specifically, at 682, TCAM entries are created to match a given access control list, denoted as $ACL_{ij}$, where $ACL_{ij}$ refers to an ACL for a particular service chain ij. As noted, a linecard and switch may support multiple service chains. As such, multiple TCAM entries, each with different ACLs, may be created.

At 684, SRAM entries corresponding to the TCAM entries are created for use in redirecting the traffic to the next hop in the service chain. As noted above, the SRAM entries include overlay header mapping information for a given programmed service chain (e.g., Internet Protocol version 4 (IPv4) information, Internet Protocol version 6 (IPv6) information, IP destination address, redirect pointer, etc.). This overlay header mapping information includes information about the exact/specific overlay header that needs to be added to a packet so that it will be properly forwarded on the overlay network to the next hop in the service chain. For example, the SRAM entry includes details of the specific encapsulation/decapsulation (e.g., VxLAN encapsulation/decapsulation) needed for routing of the packet via the overlay network along the service chain.

Returning to FIG. 6A, at 686, statistics are enabled for the TCAM entries. Operations 682-686 are performed for each linecard (interface) where the associated service chain is configured. These statistics are per-TCAM entry, which enables the tracking and subsequent evaluation of, for example, how much traffic is going to each chain, and to each element within the chain. For example, a firewall may be a service in six (6) service chains and these statistics allow an administrator to determine how much traffic is going to the firewall for each chain. For each service chain, operation 688 is performed to create a probe packet to monitor the health of the next node in the service chain. In general, the entire service chain may be monitored. For example, from the ingress switch, the next hop is monitored (e.g., the switch where the first service is connected). From the switch where the first service is connected, the monitor first service is monitored, and so on.

Figure 6B:
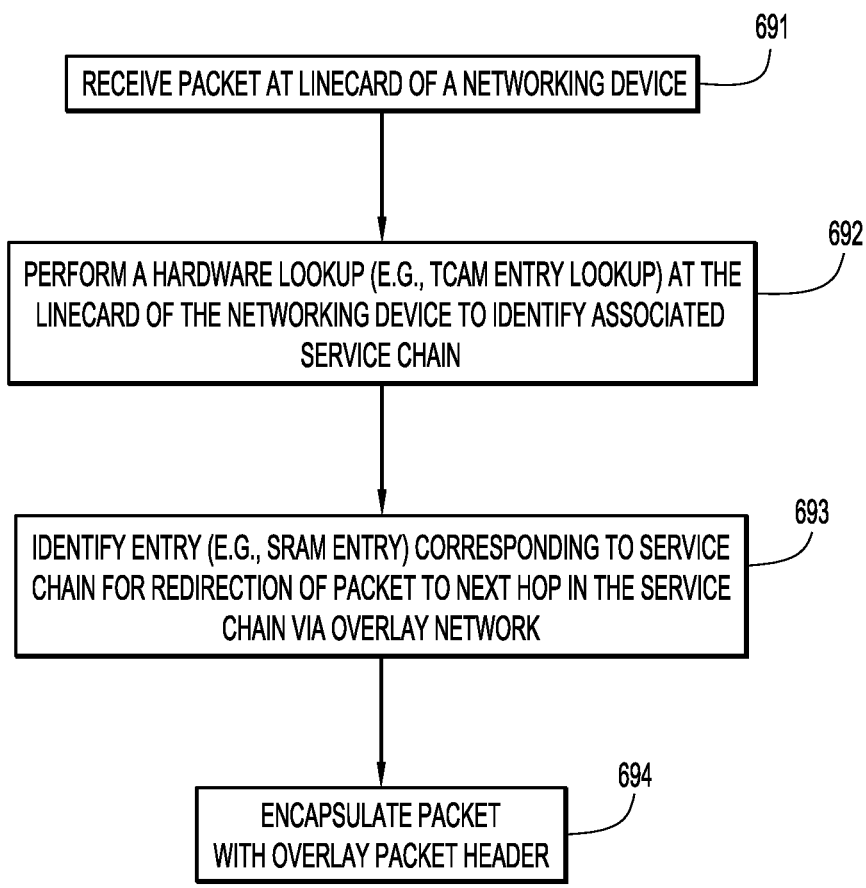
FIG. 6B is a flow chart depicting the operations of a networking device to perform the service chaining techniques presented herein, according to an example embodiment.

Reference is now made to FIG. 6B, which is a high-level flowchart illustrating a method 690 for redirection of a service chain packet by a networking device (e.g., leaf switch) over an overlay network, in accordance with examples presented herein. Method 690 is performed at a networking device operating as an ingress for an overlay network, such as networking device that receives a packet from a Host, a networking device that receives a packet from a service function in a service chain, etc.

Method 690 begins at 691 where a packet is received at a linecard of the networking device. At 692, a lookup is performed in the TCAM(s) of the linecard to determine whether the packet is associated with a programmed service chain and, if so, to identify the service chain with which the packet is associated. That is, using information in the received packet 120, including source information (e.g., the virtual local area network (VLAN) tag, source Internet Protocol (IP) address, and source Layer 4 port number) and destination information (e.g., destination IP address and destination Layer 4 port number), the linecard forwarding engine performs a lookup against the Access Control Lists (ACLs) in the linecard TCAM(s). This lookup identifies the service chain with which the packet received is associated (if applicable), and the forwarding path for the packet (e.g., next hope for the packet, as identified by the ACL(s)).

At 693, the identified service chain is used to identify/locate the SRAM entry that corresponds to the identified service chain. That is, the result of the TCAM lookup (e.g., identification of the service chain with which packet is associated), is used to locate a corresponding SRAM entry that includes the overlay header mapping information for the identified service chain. The overlay header mapping information for the identified service chain includes information about the exact/specific overlay header that needs to be added to the packet so that the packet will be properly forwarded on overlay network to the next hop in the service chain. For example, the SRAM entry includes details of the specific encapsulation/decapsulation (e.g., VxLAN encapsulation/decapsulation) needed for routing of the packet via the overlay network along the identified service chain.

At 694, using the information in the identified SRAM entry, the linecard forwarding engine encapsulates the packet with an overlay header that which cause networking devices in the overlay network to forward the packet to the next hop in the service chain. At 695, the encapsulated packet (i.e., the packet with the overlay header) is sent by the linecard on the overlay network. Upon receipt, subsequent networking devices (e.g., spine switches) use the overlay header encapsulating packet to direct the packet to the correct destination on the overlay network.

Figure 7:
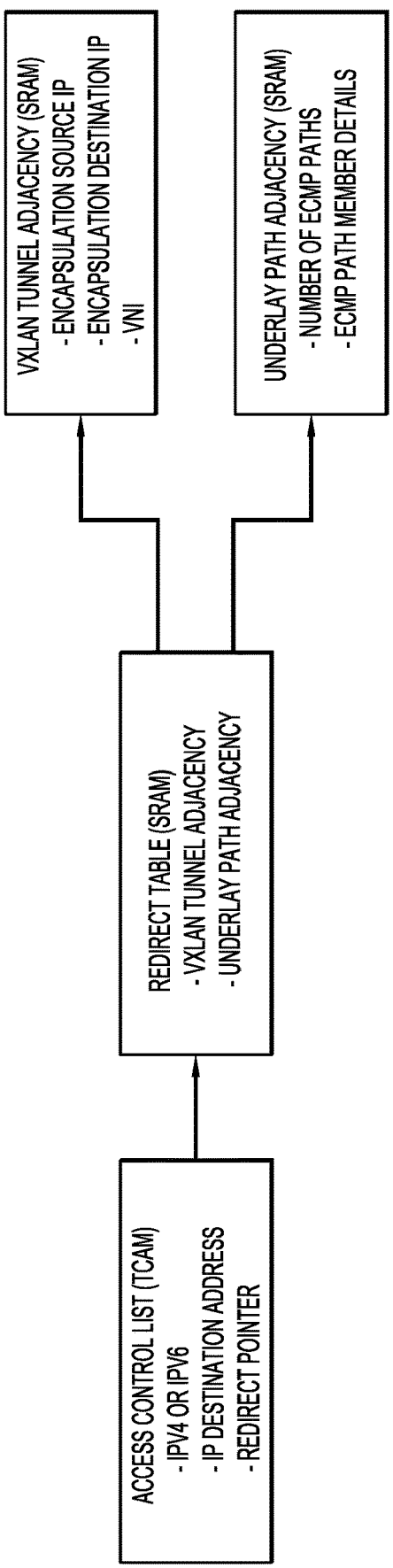
FIG. 7 is a diagram schematically illustrating the forwarding chain for next hop redirects, according to an example embodiment.

FIG. 7 is a diagram schematically illustrating the hardware table format for next hop redirects for a forwarding chain, according to an example embodiment. More specifically, FIG. 7 illustrates that, following receipt of a packet at a linecard of a networking device, information obtained from the packet is used to perform a lookup against one or more Access Control Lists (ACLs) stored in at least one ternary content-addressable memory (TCAM) of a linecard. In response to the TCAM lookup, a lookup in a Static Random Access Memory (SRAM) (redirect table) is performed. The lookup in the SRAM identifies an entry corresponding to the identified service chain, wherein the entry includes overlay network information for forwarding packets along the identified service chain via an overlay network. The overlay network information can be associated with a VxLAN Tunnel Adjacency (SRAM), such as Source IP address, encapsulation of Destination IP address, VxLAN Network Identifier (VNI), etc.) The overlay network information can also or alternatively be associated with an underlay path Adjacency (SRAM), such as number of ECMP paths, ECMP path member details, etc.

Figure 8:
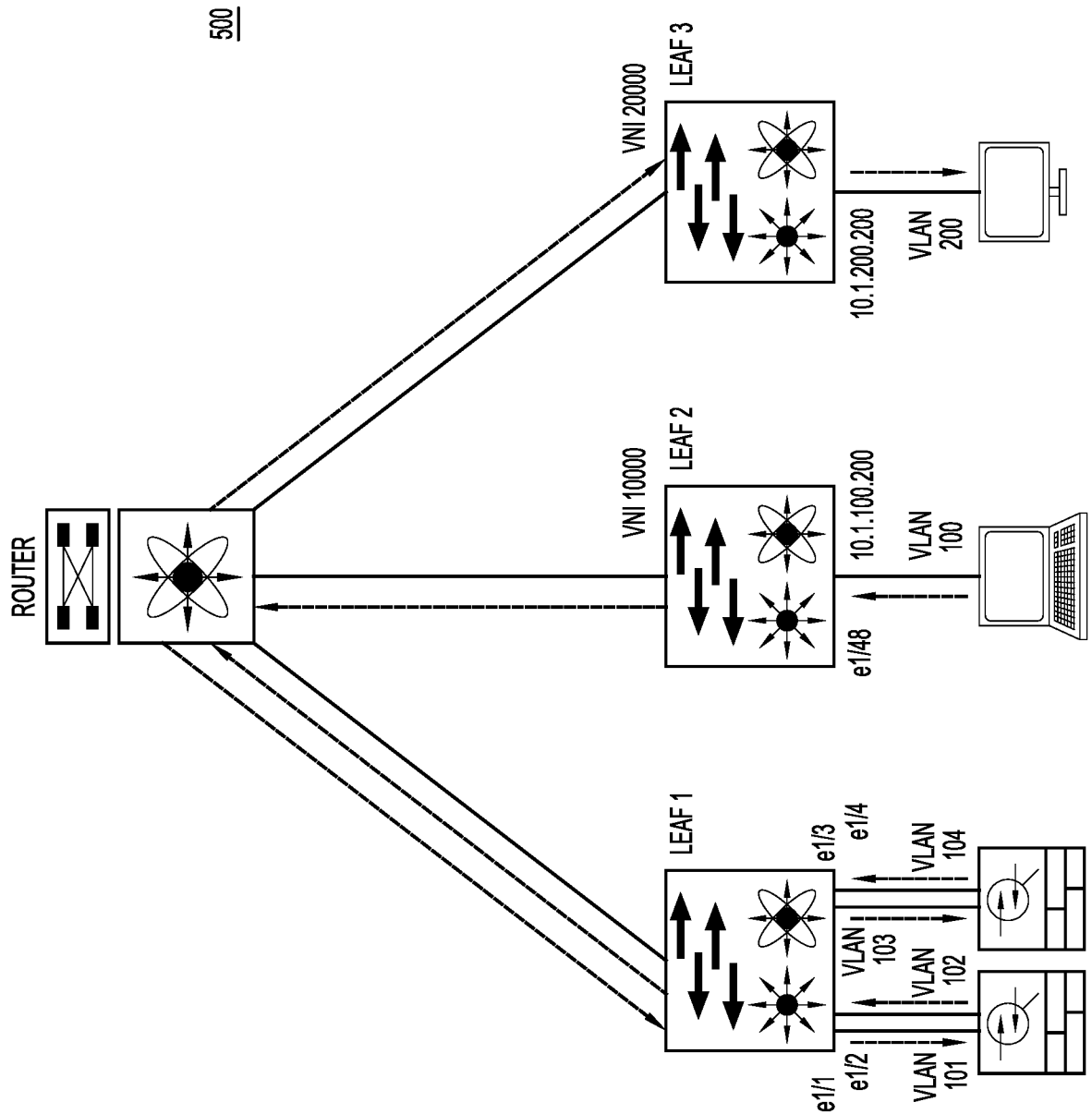
FIG. 8 is a diagram of an example spine-leaf switch architecture configured to support service chains, according to an example embodiment.

Reference is now made to FIG. 8. FIG. 8 shows an example spine-leaf system 500 that includes a single spine switch and three leaf switches. The following are the command line interface (CLI) commands to configure the ACLs and service chains (e.g., to perform the method of FIG. 6A).
Enabling the Service-Chaining Feature:
Switch(config) #feature service-chaining
Enabling Port-Group:
Switch(config) #service-chaining port-group VxLAN
Switch(config-port-group) #int vlan 501
Switch(config-pg-node) #service-chaining port-group PG2
Switch(config-port-group) #int vlan 102
Enabling Device-Group:
Switch(config-pg-node) #service-chaining device-group ASA
Switch(config-device-group) #node ip 10.1.101.100
Switch(config-device-group) #service-chaining device-group APPFW
Switch(config-device-group) #node ip 10.1.103.100
Creating the Access-Lists:
Switch(config) #ip access-list HOST-10.1.100.200
Switch(config-acl)#10 permit ip 10.1.100.200 255.255.255.255 any
Creating the Service-Chaining Instance:
switch(config) #service-chaining VxLAN-PODtoPOD
Switch(config-service-chaining)#10 access-list HOST-10.1.100.200
ingress-port-group PG1 egress-device-group ASA mode forward
Switch(config-service-chaining)#20 access-list HOST-10.1.100.200
ingress-port-group APPFW egress-device-group APPFW mode forward
Switch(config-service-chaining-instance) #no shut
Verifying the Service-Chaining Configuration:
Switch #show run service-chaining
service-chaining device-group ASA
   node ip 10.1.101.100
service-chaining device-group APPFW
   node ip 10.1.101.100
service-chaining port-group PG2
interface Vlan102
service-chaining port-group VxLAN
interface Vlan501
service-chaining VxLAN-PODtoPOD
chain 10
10 access-list HOST-10.1.100.200 ingress-port-group VxLAN egress-device-group ASA mode forward
20 access-list HOST-10.1.100.200 ingress-port-group PG2 egress-device-group APPFW mode forward
no shutdown

| Checking the status of Service-Chaining instance: Switch# sh service-chaining VxLAN-PODtoPOD | |
|---|---|
| Instance name | Status |
| VxLAN-PODtoPOD | ACTIVE |

| chain 10 | | | | |
|---|---|---|---|---|
| sequence no | access-list | ingress-port-group | egress-device-group | mode |
| 10 | HOST-10.1.100.200 | VxLAN | ASA | forward |
| 20 | HOST-10.1.100.200 | PG2 | APPFW | forward |

In one aspect, a method is provided. The method comprises: receiving a packet at a linecard of a networking device; using information obtained from the packet, performing a hardware lookup at the linecard of the networking device to identify a service chain with which the packet is associated; identifying, within a memory location of the linecard, an entry corresponding to the identified service chain, wherein the entry includes overlay network information for forwarding packets along the identified service chain via an overlay network; and using the overlay network information included in the identified entry, encapsulating the packet with an overlay packet header for use in forwarding the packet via the overlay network.

In another aspect, an apparatus is provided. The apparatus comprises: a plurality of network ports; and at least one linecard, comprising: at least first and second memory locations; a physical layer interface module configured to receive a packet from at least one of the plurality of network ports; a forwarding engine configured to: use information obtained from the packet, performing a hardware lookup in the first memory location to identify a service chain with which the packet is associated, identify within the second location, an entry corresponding to the identified service chain, wherein the entry includes overlay network information for forwarding packets along the identified service chain via an overlay network, and use the overlay network information included in the identified entry to encapsulate the packet with an overlay packet header for use in forwarding the packet via the overlay network.

In another aspect, a method is provided. The method comprises: creating, at a linecard of a networking device, one or more hardware entries to match one or more Access Control Lists (ACLs) for at least one predetermined service chain; and creating, within a memory location of the linecard, at least one entry corresponding to the at least one predetermined service chain, wherein the entry includes overlay network information for forwarding packets along the service chain via an overlay network.

In another aspect, an apparatus is provided. The apparatus comprises: a linecard of a networking device configured to: create one or more hardware entries to match one or more Access Control Lists (ACLs) for at least one predetermined service chain; and create, within a memory location of the linecard, at least one entry corresponding to the at least one predetermined service chain, wherein the entry includes overlay network information for forwarding packets along the service chain via an overlay network.

Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving a packet at a linecard of a networking device, the packet identifying destination information for the packet;
using information obtained from the packet, performing a hardware lookup at the linecard of the networking device to identify a service chain with which the packet is associated, the service chain comprising a plurality of applications that process the packet along a route from the networking device to a destination endpoint;
identifying, within a memory location of the linecard, an entry corresponding to the identified service chain, wherein the entry includes overlay network information for forwarding packets to a next hop in the identified service chain via an overlay network; and
using the overlay network information included in the entry, encapsulating the packet with an overlay packet header for use in forwarding the packet via the overlay network to the next hop in the identified service chain, wherein the overlay packet header includes destination information for the next hop in the identified service chain.

2. The method of claim 1, wherein performing the hardware lookup comprises:
performing a lookup against one or more Access Control Lists (ACLs) stored in hardware of the linecard, wherein the one or more ACLs are each associated with one or more programmed service chains.

3. The method of claim 1, wherein performing the hardware lookup comprises:
performing a lookup against one or more Access Control Lists (ACLs) stored in at least one ternary content-addressable memory (TCAM) of the linecard, wherein the one or more ACLs are each associated with one or more programmed service chains.

4. The method of claim 1, wherein performing the hardware lookup comprises:
performing the hardware lookup at the linecard using source information and the destination information for the packet.

5. The method of claim 4, wherein performing the hardware lookup using the source information and the destination information for the packet comprises:
performing the hardware lookup using at least a virtual local area network (VLAN) tag, source Internet Protocol (IP) address, source Layer 4 port number, destination IP address, and destination Layer 4 port number obtained from the packet.

6. The method of claim 1, wherein identifying, within a memory location of the linecard, an entry corresponding to the identified service chain comprises:
identifying an entry in at least one Static Random Access Memory (SRAM) of the linecard.

7. The method of claim 1, wherein the entry includes information about a specific overlay packet header for addition to the packet so that the packet will be forwarded on the overlay network to the next the hop in service chain.

8. The method of claim 6, wherein the entry includes details of overlay network encapsulation for the packet.

9. The method of claim 1, further comprising:
forwarding the packet, with the overlay packet header, to another networking device associated with the next hop in the identified service chain via the overlay network.

10. A method comprising:
creating, at a linecard of a networking device, one or more hardware entries to match one or more Access Control Lists (ACLs) for at least one service chain, the service chain comprising a plurality of applications that process packets along a route to a destination endpoint; and
creating, within a memory location of the linecard, at least one entry corresponding to the at least one service chain, wherein the entry includes overlay network information for forwarding packets to a next hop along the route of the service chain via an overlay network, wherein the overlay network information includes destination information for the next hop in the service chain.

11. The method of claim 10, further comprising:
enabling statistic tracking for each of the one or more hardware entries.

12. The method of claim 10, further comprising:
creating a probe to monitor health of a next node in the service chain.

13. The method of claim 10, wherein creating the one or more hardware entries to match one or more ACLS for at least one predetermined service chain comprises:
   creating one or more hardware entries in at least one ternary content-addressable memory (TCAM) of the linecard.

14. The method of claim 10, wherein creating, within a memory location of the linecard, at least one entry corresponding to the at least one service chain comprises:
   creating at least one entry in at least one Static Random Access Memory (SRAM) of the linecard.

15. An apparatus, comprising:
   a plurality of network ports; and
   at least one linecard, comprising:
      at least first and second memory locations;
      a physical layer interface module configured to receive a packet from at least one of the plurality of network ports, the packet identifying destination information for the packet; and
      a forwarding engine configured to:
         use information obtained from the packet to perform a hardware lookup in the first memory location to identify a service chain with which the packet is associated, the service chain comprising a plurality of applications that process the packet along a route to a destination endpoint,
         identify within the second memory location, an entry corresponding to the identified service chain, wherein the entry includes overlay network information for forwarding packets to a next hop in the identified service chain via an overlay network, and
         use the overlay network information included in the entry to encapsulate the packet with an overlay packet header for use in forwarding the packet via the overlay network to the next hop in the identified service chain, wherein the overlay packet header includes destination information for the next hop in the identified service chain.

16. The apparatus of claim 15, wherein the first memory location comprises at least one ternary content-addressable memory (TCAM) of the linecard, and wherein the forwarding engine is configured to perform a lookup against one or more Access Control Lists (ACLs) stored in the at least one TCAM of the linecard, wherein the one or more ACLs are each associated with one or more programmed service chains.

17. The apparatus of claim 15, wherein the forwarding engine is configured to perform the hardware lookup using source information and the destination information for the packet.

18. The apparatus of claim 17, wherein the forwarding engine is configured to perform the hardware lookup using at least a virtual local area network (VLAN) tag, a source Internet Protocol (IP) address, a source Layer 4 port number, a destination IP address, and a destination Layer 4 port number obtained from the packet.

19. The apparatus of claim 15, wherein the second memory location comprises at least one Static Random Access Memory (SRAM) of the linecard.

20. The apparatus of claim 15, wherein the entry includes information about a specific overlay packet header for addition to the packet so that the packet will be forwarded on the overlay network to the next hop in the identified service chain.

* * * * *